RADIO RECEIVER EMPLOYING A SINGLE TUBE AMPLIFIER-CONVERTER

Filed Dec. 30, 1948 2 SHEETS—SHEET 1

ROBERT ADLER
JOHN G. SPRACKLEN
*INVENTOR.*

BY Bruce [signature]

HIS AGENT

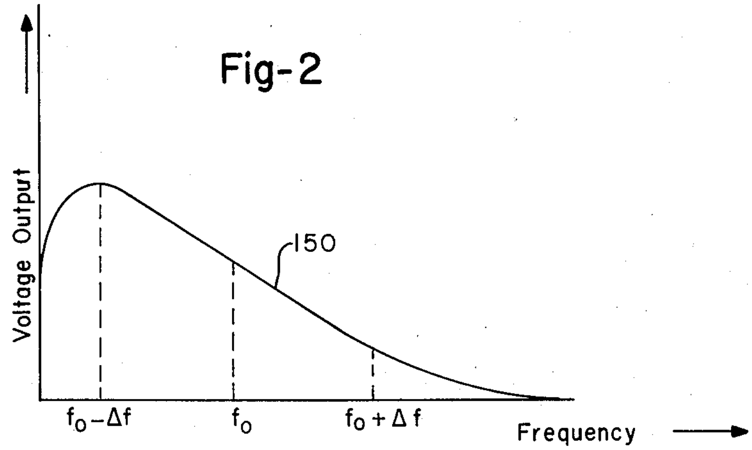
Fig-3
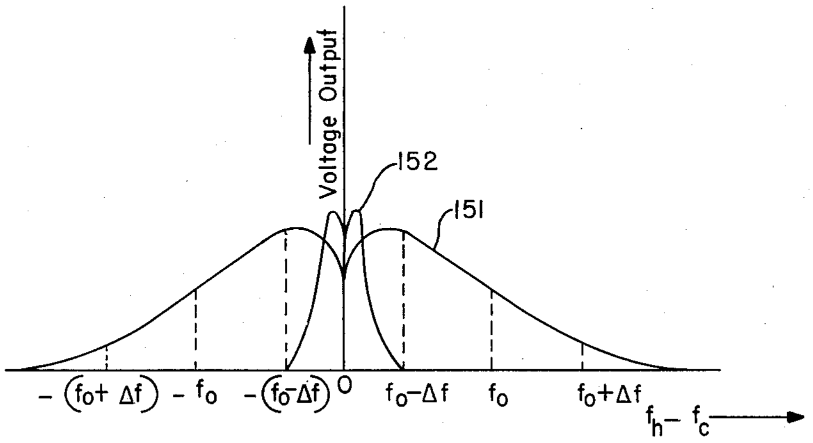
ROBERT ADLER
JOHN G. SPRACKLEN
INVENTOR.
BY Bruce L. Birchard
HIS AGENT Patented Oct. 28, 1952 2,616,035

UNITED STATES PATENT OFFICE 2,616,035

RADIO RECEIVER EMPLOYING A SINGLE TUBE AMPLIFIER-CONVERTER

Robert Adler and John G. Spracklen, Chicago, Ill., assignors to Zenith Radio Corporation, a corporation of Illinois Application December 30, 1948, Serial No. 68,286

8 Claims. (Cl. 250—20)

Figure 1:
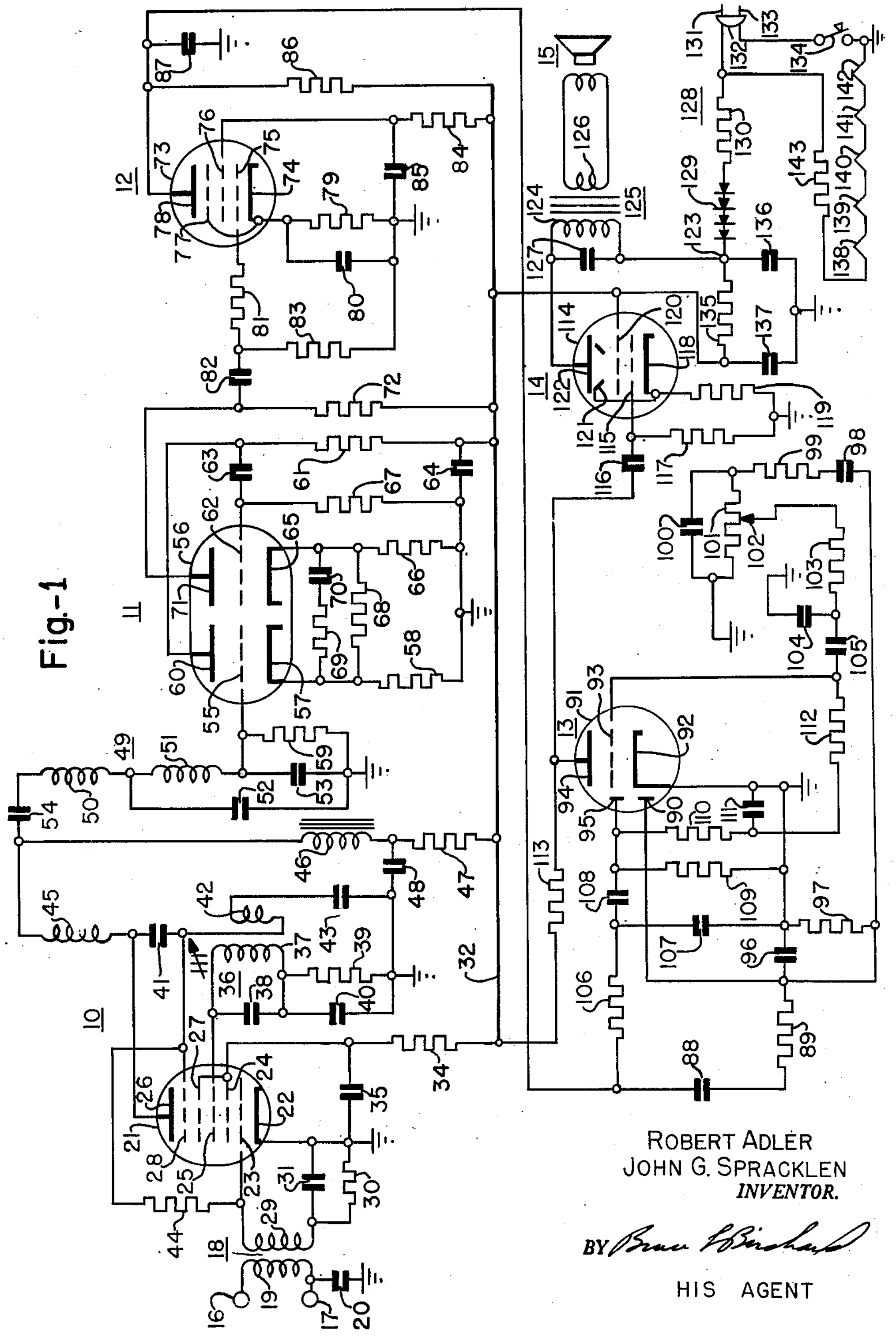

This invention relates to signal translating apparatus and more particularly to radio receivers of the superheterodyne type.

In the reception of radio waves incorporating signal information modulated on a high frequency carrier, it is customary to provide at least one stage of radio-frequency amplification for the input signal. Conventional superheterodyne receivers employ a frequency converter stage, following the radio-frequency amplifier, in which the incoming signal is heterodyned with locally generated oscillations in order to provide an intermediate-frequency signal which is readily amplifiable before detection. Thus, in conventional receivers, radio-frequency amplification and frequency conversion require two stages, each incorporating an electron discharge device.

In the copending application of Robert Adler, Serial No. 69,341, filed December 29, 1948, for Signal Translating Apparatus and assigned to the present assignee, there are disclosed and claimed several novel amplifier-converters in which radio-frequency amplification and frequency conversion are effected along a single electron stream. The arrangements disclosed and claimed in the copending application utilize space-charge coupling effects to obtain radio-frequency gain, and frequency conversion is effected by superimposing a local oscillator signal on the amplified radio-frequency signal. It is an important object of the present invention to provide substantial simplification of an amplifier-converter which utilizes space-charge coupling effects to obtain radio-frequency gain at least comparable to that obtainable with a conventional single stage radio-frequency amplifier.

It is a further object of the invention to provide a simplified amplifier-converter which requires only a single parallel resonant circuit to effect radio-frequency amplification and frequency conversion along a single electron stream.

In the copending application of Robert Adler, Serial No. 67,985, filed December 29, 1948, for Radio Receiving Apparatus, and assigned to the present assignee, there is disclosed and claimed a novel radio receiver of the super-heterodyne type which employs an intermediate-frequency channel selective to an intermediate-frequency band centered with respect to a frequency corresponding to substantially one-quarter of the minimum frequency separation, established either by law or by custom, between adjacent broadcasting stations. It is an important object of this invention to provide an improved receiver of this general type which requires a minimum number of component elements by virtue of the use of an improved and simplified radio frequency amplifier-frequency converter.

Still another object of the invention is to provide an improved and simplified amplifier-converter which utilizes space-charge coupling effects in conjunction with a particularly low intermediate-frequency to obtain an overall gain far in excess of that available with a conventional radio-frequency amplifier and frequency converter.

In accordance with the present invention, a radio-frequency input signal, having a predetermined modulation component band width, is applied to the input circuit of an electron discharge device having, in the order named, a cathode, an input grid, an accelerating electrode, a control grid, and an anode all disposed across a common electron path. A heterodyning frequency signal is locally generated by an oscillating system including the electron discharge device. A single parallel resonant circuit, which is included in the oscillating system and tuned to the heterodyning frequency, is coupled to the control grid and the cathode. An aperiodic output circuit (including a low-pass filter), selective to an intermediate-frequency band having a width at least equal to that of the signal frequency band and comprising exclusively frequencies lower than one-half of the product of the mean effective transconductance (to be defined hereinafter) within the signal frequency band of the input grid with respect to the control grid, the mean branch reactance of the parallel resonant circuit, and the heterodyning frequency, is coupled to the anode and the cathode. With this arrangement, radio-frequency signal amplification occurs between the input grid and the control grid, and frequency conversion is effected by virtue of a cyclic variation of the transconductance of the control grid with respect to the anode which is induced by the locally generated heterodyning frequency signal.

The features of the present invention which are believed to be novel are set forth with particularity in the appended claims. The invention, together with further objects and advantages thereof, may more readily be understood, however, by reference to the following description taken in connection with the accompanying drawings, in the several figures of which like reference numerals indicate like elements, and in which:

Fig. 1 is a schematic circuit diagram of a radio receiver constructed in accordance with the present invention, and Figs. 2 and 3 are graphical representations which are useful in explaining the manner of operation of the receiver shown schematically in Fig. 1.

Referring particularly now to Fig. 1, radio-frequency input signals are amplified and converted in frequency by an amplifier-converter stage 10. The intermediate-frequency output from amplifier-converter 10 is transferred to an intermediate-frequency channel including an intermediate-frequency amplifier 11 and an amplitude limiter 12. The amplitude limited output from limiter 12 is detected and the detected voltage is amplified in a detector-amplifier stage 13, the audio-frequency output of which is transferred to a power amplifier stage 14 and thence to a loud speaker or utilization device 15.

Specifically, frequency modulated input signals applied to input terminals 16 and 17 from any suitable antenna system (not shown) are transferred to the input circuit of amplifier-converter 10 by means of an input transformer 18. Terminal 17 is bypassed to ground by means of a condenser 20.

Amplifier-converter 10 comprises an electron discharge device 21 having in the order named a cathode 22, an input grid 23, an accelerating electrode 24, a control grid 25, and an anode 26; if the device 21 is of the conventional pentagrid variety, a screen grid 27 and a suppressor grid 28 are also included. Accelerating electrode 24 may be of either mesh or slotted construction. Cathode 22 of device 21 is grounded, and the secondary 29 of input transformer 18 is coupled to the input grid 23 and to the cathode 22 through a network comprising a grid resistor 30 and a bypass condenser 31.

Accelerating electrode 24 is connected to the operating potential bus 32 through a decoupling resistor 34. A bypass condenser 35 is connected between decoupling resistor 34 and ground.

A parallel resonant circuit 36, which may be either tuned or tunable and which comprises an inductor 37 and a condenser 38, is connected to control grid 25. A passive biasing network, comprising a resistor 39 shunted by a condenser 40, is connected between parallel resonant circuit 36 and ground.

Suppressor grid 28 is connected to anode 26 through a feedback condenser 41 and further is connected to ground through a feedback coil 42, which is inductively coupled to inductor 37 of parallel resonant circuit 36, and an isolating condenser 43. A neutralizing resistor 44 is connected between suppressor grid 28 and input grid 23.

Anode 26 is connected to operating potential bus 32 through a radio-frequency choke 45, a load inductor 46, and a decoupling resistor 47. A bypass condenser 48 is connected between decoupling resistor 47 and ground.

A low-pass filter 49, comprising series inductors 50 and 51 and shunt condensers 52 and 53, is coupled to load inductor 46 by means of a coupling condenser 54. Inductor 51 is connected to the control grid 55 of the first section of a twin triode type electron discharge device 56 included in intermediate-frequency amplifier 11. The cathode 57 of the first section of device 56 is connected to ground through a cathode bias resistor 58, and a grid resistor 59 is connected between control grid 55 and ground. The anode 60 of the first section of device 56 is connected to the operating potential bus 32 through a load resistor 61, and to the control grid 62 of the second section of device 56 through a coupling condenser 63. A bypass condenser 64 is connected between operating potential bus 32 and ground. The cathode 65 of the second section of device 56 is connected to ground through a cathode bias resistor 66, and a grid resistor 67 is connected between control grid 62 and ground. Cathodes 57 and 65 are connected together through a feedback resistor 68 and through the series combination of a resistor 69 and a condenser 70. The anode 71 of the second section of device 56 is connected to operating potential bus 32 through a load resistor 72.

Amplitude limiter 12 comprises an electron discharge device 73 having a cathode 74, a control grid 75, a screen grid 76, a suppressor grid 77, and an anode 78. Suppressor grid 77 is connected to cathode 74. Cathode 74 is connected to ground through a passive biasing network comprising a resistor 79 and a bypass condenser 80. Control grid 75 is connected to anode 71 of the second section of device 56 through a limiting resistor 81 and a coupling condenser 82. A grid resistor 83 is connected between the junction of resistor 81 and condenser 82 and ground. Screen grid 76 is connected to operating potential bus 32 through a decoupling resistor 84 and is bypassed to ground by a condenser 85. Anode 78 is connected to operating potential bus 32 through a load resistor 86 and to ground through a filter condenser 87.

Anode 78 of electron discharge device 73 is connected through a blocking condenser 88 and a filter resistor 89 to a first diode plate 90 of an electron discharge device 91, which also includes a cathode 92, a control grid 93, an anode 94, and a second diode plate 95. Cathode 92 is connected to ground. First diode plate 90 is connected to cathode 92 through the parallel combination of a filter condenser 96 and a load resistor 97.

First diode plate 90 is connected to ground through a coupling condenser 98, a series filter resistor 99, and the parallel combination of a filter condenser 100 and a volume control resistor 101. A variable tap 102 on volume control resistor 101 is connected to control grid 93 through a filter, comprising a series resistor 103 and a shunt condenser 104, and an isolating condenser 105.

Anode 78 is also connected to second diode plate 95 through a filter, comprising a series resistor 106 and a shunt condenser 107, and through a load condenser 108. Second diode plate 95 is connected to cathode 92 through a load resistor 109. Second diode plate 95 is connected to control grid 93 through a filter, comprising a series resistor 110 and a shunt condenser 111, and through a grid resistor 112.

Anode 94 of electron discharge device 91 is connected to operating potential bus 32 through a load resistor 113.

Power amplifier 14 comprises an electron discharge device 114 of the beam power type, the control grid 115 of which is coupled to anode 94 of electron discharge device 91 through a coupling condenser 116. Control grid 115 is connected to ground through a grid resistor 117. The cathode 118 of device 114 is connected to ground through a bias resistor 119. The screen grid 120 of device 114 is connected to operating potential bus 32. The beam forming electrode 121 of device 114 is connected to cathode 118. The anode 122 of device 114 is connected to a point 123, which is maintained at a positive unidirectional operating potential through the primary 124 of an output transformer 125, the secondary 126 of which is connected to loud-speaker 15. A bypass condenser 127 is provided in shunt with primary 124.

A power supply unit 128 is provided for energizing operating potential bus 32. Power supply system 128 comprises a bank of rectifier units 129 connected through a series limiting resistor 130 to one terminal 131 of a power plug 132 which is adapted to be received in a conventional alternating current outlet. The second terminal 133 of plug 132 is connected to ground through a switch 134. Rectifier bank 129 is connected to operating potential bus 32 through a filter comprising a series resistor 135 and a pair of shunt condensers 136 and 137. The filaments 138—142 of electron discharge devices 21, 56, 73, 91, and 114 are connected in series with a filament dropping resistor 143 between terminals 131 and 133.

In operation, when plug 132 is inserted in a conventional 110-volt alternating current outlet, and switch 134 is closed, the alternating voltage supplied from the power line (not shown) is rectified by rectifier bank 129, which may, for example, comprise a number of serially connected selenium rectifier units or the like, although it is apparent that diode rectifiers may be employed. Operating potential bus 32 is energized by the rectified output of rectifier bank 129 and is maintained at a substantially constant direct current potential through the filtering effect of elements 135—137. At the same time, when switch 134 is closed, filaments 138—142 are energized.

The apparatus shown in Fig. 1 has been illustrated in the form of a frequency modulation radio receiver, the invention affording a particular advantage in connection with the reception of frequency modulated input signals. However, it is contemplated that the invention may be employed in connection with other types of receivers, as for example, single sideband or double sideband amplitude modulation receiving apparatus, if appropriate changes are made in the detector to accommodate the particular type of received signal.

In the case of frequency modulation broadcasting in the United States at the present time, the minimum carrier frequency separation in any one locality is set by the Federal Communications Commission at 400 kilocycles per second, and the maximum modulation component frequency band width is set at 150 kilocycles per second. In copending application Serial No. 67,985, there is disclosed and claimed a receiver including an intermediate-frequency channel selective to an intermediate-frequency band having a width substantially equal to that of the modulation component frequency band and centered with respect to a frequency of substantially one-quarter of the minimum carrier frequency separation. The present invention contemplates the use of a particular type of amplifier-converter which provides exceptionally high overall gain in combination with a receiver as disclosed and claimed in copending application Serial No. 67,985. It is also contemplated, however, that the amplifier-converter disclosed and claimed in the present application may be advantageously employed in connection with other types of radio receiving apparatus.

The amplifier-converter 10 of the receiver of Fig. 1 is of a special type, employing space-charge coupling to provide radio-frequency amplification along the same electron stream in which frequency conversion takes place. The operation of amplifier-converter 10 may perhaps best be understood in view of a brief discussion of the principle known as space charge coupling.

It is known in the art that when a stream of electrons is accelerated under the influence of a high potential screen electrode and is thereafter retarded by a grid operating at approximately zero potential, a space charge cloud or virtual cathode is established in the vicinity of the low potential grid. Most of the emitted electrons terminate at the high potential screen electrode or at the anode; and few electrons strike the low potential grid.

If now, the stream of electrons is varied before passing through the high potential electrode, as by a signal impressed on the input grid, the charge density of the virtual cathode is caused to vary in a corresponding manner, and a signal frequency potential variation is established at the low potential grid by electrostatic induction; consequently, a corresponding current is capacitively induced in the circuit coupled between the low potential grid and the cathode. This effect, hereinafter termed the space charge coupling effect, has been formally likened to a unilateral negative capacity, from the input grid to the low potential grid, which has a magnitude in the order of several micromicrofarads. As a first approximation, the term "effective transconductance" is employed to signify the susceptance, at the input signal center frequency, of the equivalent space charge coupling capacity from one electrode to another, as for example, from the input grid to the low potential control grid. If the input signal center frequency is designated $f$, and the equivalent space charge coupling capacity is denoted by the letter C, the effective transconductance, at the input signal center frequency, of the input grid with respect to the control grid is approximately $2\pi fC$.

The effective transconductance is thus proportional to the signal frequency and attains the order of magnitude of the static transconductance (as commonly defined) of the input grid at frequencies of about 100 to 200 megacyles per second. Transit time effects prevent any further increase of effective transconductance at higher frequencies. Furthermore, transit time effects introduce an unavoidable amount of phase delay. The effective transconductance is, however, of very useful magnitude in the frequency range presently used, for example, in frequency modulation and television broadcasting.

The effective transconductance may be accurately measured by applying an input signal to the first grid 23 and observing the signal frequency current induced in the circuit 36 coupled to the low potential or control grid 25. The effective transconductance at the particular signal frequency used is then defined, as used in the following description and in the appended claims, as the amount of signal frequency current in the circuit coupled to the control grid 25 per unit signal frequency input voltage. The "mean effective transconductance" within the input signal frequency band is defined as the geometric mean of the effective transconductances at the frequencies determining the band.

In operation, a radio-frequency input signal appearing across primary 19 of input transformer 18 is applied to the input circuit of electron discharge device 21. The application of suitable positive unidirectional operating potential, as from operating bus 32, to accelerating electrode 24 establishes a virtual cathode in the vicinity of control grid 25. Application of a radio-frequency input signal between input terminals 16 and 17 effects a corresponding variation in the charge density of the virtual cathode and electrostatically induces a current of corresponding frequency in parallel resonant circuit 36. If the parameters of circuit 36 are such that the impedance of such circuit throughout the modulation component frequency band is at least equal to the reciprocal of the effective transconductance of input grid 23 with respect to control grid 25 at the input signal center frequency, voltage amplification occurs between input grid 23 and control grid 25. In practice, it is preferred that the impedance of circuit 36 throughout the modulation component frequency band be substantially greater than the reciprocal of such effective transconductance, and ratios of impedance to effective transconductance as large as 100 may effectively be employed.

At the same time, oscillations of a frequency determined by the tuning of circuit 36 are induced in that circuit as the result of voltage feedback from anode 26 to control grid 25 through feedback coil 42 and circuit 36. These oscillations are injected on control grid 25, thereby cyclically to vary the transconductance of control grid 25 with respect to anode 26 at the heterodyning frequency. It is contemplated that oscillations may be generated in circuit 36 in any other suitable manner, as for example, in transitron fashion.

Since control element 25 is a grid, potential variations in parallel resonant circuit 36 impress a new and amplified radio-frequency signal on the electron stream between cathode 22 and anode 26, and intermodulation between this new and amplified signal and the locally generated heterodyning oscillations occurs in a manner well-known in the art. The output circuit, which comprises load inductor 46, is made selective to an intermediate frequency band having a width at least as great as that of the modulation component frequency band and centered with respect to a frequency corresponding to the difference between the input center frequency and the heterodyning frequency. In practice, in order to secure efficient amplification and conversion, it is preferred that the difference between the input signal frequency and heterodyning frequency be made small; in particular, in the embodiment of Fig. 1, this difference in frequency is made equal to substantially one-quarter of the predetermined minimum carrier frequency separation, and an over-all gain in amplifier-converter 10 of the order of 500 times is obtained.

The explanation of the operation of amplifier-converter 10 has been developed on the basis of the relationship between the effective transconductance of input grid 23 with respect to control grid 25 and the impedance of parallel resonant circuit 36. The operation may also be viewed in another way. The radio frequency gain from input grid 23 to control grid 25 is equal to the product of the mean effective transconductance within the input signal frequency band of input grid 23 with respect to control grid 25 and the impedance at the signal frequency of circuit 36. The impedance at the signal frequency of circuit 36 is equal to one-half of the product of the mean branch reactance of that circuit and the ratio of the heterodyning frequency to the difference between the heterodyning frequency and the input signal frequency, where the mean branch reactance of circuit 36 is defined as the geometric mean of the reactances of inductor 37 and condenser 38, or the square root of the ratio of the inductance of inductor 37 to the capacity of condenser 38. It therefore follows that in order to retain the desired modulation components while accomplishing a radio frequency gain greater than unity, the output circuit must be made selective to an intermediate frequency band having a width at least equal to that of the input signal frequency band and comprising exclusively frequencies lower than one-half of the product of the mean effective transconductance within the input signal frequency band of the input grid 23 with respect to control grid 25, the mean branch reactance of parallel resonant circuit 36, and the heterodyning frequency.

In the receiver shown schematically in Fig. 1, the intermediate-frequency channel, which comprises intermediate-frequency amplifier 11 and amplitude limiter 12, is made selective to an intermediate-frequency band having a width (from $f_0-\Delta f$ to $f_0+\Delta f$, where $\Delta f$ is the maximum frequency deviation) substantially equal to that of the modulation component frequency band and centered with respect to a frequency $f_0$ of substantially one-quarter of the minimum carrier frequency separation. By a frequency of substantially one-quarter of the minimum carrier frequency separation is meant a frequency which differs from one-quarter of the minimum carrier frequency separation by an amount less than one-half of the difference between the modulation component band width and one-half of the minimum carrier frequency separation. To this end, the load for amplifier converter 10 is aperiodic and may comprise inductor 46 and two-section inductance-capacitance low-pass filter 49, although other aperiodic load circuits, such as suitable resistance-capacitance networks or other non-resonant or more-than-critically damped resonant circuits, may be employed. With this arrangement, the selectivity of the intermediate-frequency band is determined at the low end by the inductance of inductor 46 and the capacity of condenser 54 and at the high end by the cut-off frequency of inductance-capacitance filter 49.

The intermediate-frequency signal appearing across the output of inductance-capacitance filter 49 is applied to the input grid 55 of the first section of electron discharge device 56, and an amplified intermediate-frequency signal appears across load resistance 61. This amplified signal is in turn applied to the control grid 62 of the second section of device 56, and a further amplified signal appears across load resistor 72. Thus it is seen that intermediate-frequency amplifier 11 comprises a pair of cascaded resistance coupled triode amplifiers. In order to provide the desired band width characteristics for amplifier 11, the cathode bias resistors 58 and 66 associated with the respective sections of device 56 are unbypassed, and a regenerative feedback network, comprising resistor 68 shunted by the series combination of resistor 69 and condenser 70, is coupled between cathodes 57 and 65. With this arrangement, the amount of regenerative feedback is increased with an increase in frequency, and a substantially flat response throughout the intermediate-frequency band may be obtained.

While the intermediate-frequency amplifier has been shown as comprising a pair of cascaded resistance-coupled triode amplifiers, it is contemplated that a choke-coupled pentode amplifier or other suitable construction may be employed.

The intermediate-frequency channel may also include an amplitude limiter 12, which is coupled to the output of intermediate frequency amplifier 11.

Negative half-cycles are clipped when grid 75 of discharge device 73 is driven to cutoff, and positive half-cycles are limited in amplitude by the action of grid resistor 81.

The limited output from amplitude limiter 12 is applied to the input of a frequency detector comprising cathode 92 and first diode plate 90 of device 91 and a frequency responsive discriminator network which consists essentially of resistors 86 and 89 and condensers 87 and 96. A detected output voltage appears across resistor 97 and is applied to the control grid 93 of the amplifier section of device 91 through a volume control resistor 101 and suitable intermediate frequency filters. An amplified audio-frequency signal is then developed across load resistor 113. The output voltage versus frequency characteristic 150 of such a frequency detector is shown graphically in Figure 2, in which voltage output is plotted as ordinate against frequency as abscissa. The detector, exhibiting the response characteristic of curve 150, is substantially linear throughout the intermediate-frequency band from $f_0-\Delta f$ to $f_0+\Delta f$ and is substantially unresponsive to frequencies above the intermediate-frequency band. It therefore follows that the output from the frequency detector represents an audio-frequency signal which corresponds to the frequency modulation of the intermediate-frequency signal. Because the detector is substantially unresponsive to frequencies above the intermediate-frequency band, undesired skirt responses are effectively eliminated.

In order further to understand the operation of the invention, there is shown in Figure 3 a graphical representation of the voltage output of the frequency detector plotted as a function of the difference between the heterodyning frequency $f_h$ and the carrier frequency $f_c$ of the information to be received. Curve 151 represents the characteristic of the frequency detector. As the local oscillator is tuned toward and through the carrier frequency, two responses are obtained, one at intermediate frequency $-f_0$ when the heterodyning frequency is lower than the carrier frequency and one at intermediate frequency $+f_0$ when the heterodyning frequency is higher than the carrier frequency. These two responses are of substantially equal strength, and the receiver may be tuned to either with equally good results. Furthermore, the relations between the minimum carrier frequency separation, the width of the modulation component frequency band, and the center frequency of the intermediate-frequency band insure the absence of undesired interference or confusion between the desired response to one station and the image response to the next adjacent station.

In the region between the two intermediate frequency response bands, from frequency-$(f_0-\Delta f)$ to frequency $f_0+\Delta f$, the beat frequencies between the local oscillator frequency and the carrier frequency traverse an audible range. This phenomenon is manifested as a whistle when the receiver is tuned between the two responses. In order to eliminate undesirable reproduction of the audible beat note, a squelch circuit is coupled between the intermediate-frequency channel and the audio-frequency amplifier.

In the circuit of Figure 1, the squelch circuit comprises a low-pass filter consisting of series resistor 106 and shunt condenser 107, the time constant being so chosen that only audible frequencies are passed; for example, a time constant of 100 microseconds may be used. A diode rectifier, comprising second diode plate 95 and cathode 92 of device 91, is coupled to the output of the low-pass filter by means of a coupling condenser 108, and the rectified output appears across resistor 109. This rectified output contains a unidirectional squelch potential which is applied through filter resistor 110 and grid resistor 112 to the control grid 93 of the audio-frequency amplifier to render it inoperative in response to the appearance in the intermediate-frequency channel of frequencies below the intermediate-frequency band. Resistor 110 and condenser 111 serve to filter out from the rectified voltage developed across resistor 109 any audio-frequency components, so that only the unidirectional squelch voltage is coupled to grid 93 through grid resistor 112.

Referring again to Figure 3, curve 152 represents the unidirectional voltage output from the squelch circuit as a function of the difference between the local oscillator frequency $f_h$ and the carrier frequency $f_c$. Examination of curves 151 and 152 reveals that the detector is substantially unresponsive to frequencies above the intermediate-frequency band, and that a unidirectional squelch voltage is developed to render the audio-frequency amplifier inoperative in response to the appearance in the intermediate-frequency channel of frequencies below the intermediate-frequency band.

The audio-frequency signal developed across load resistor 113, which corresponds to the frequency modulation of the input signal, is then applied to power amplifier 14, the output of which is coupled to loud speaker 15. Power amplifier 14 and loud speaker 15 are conventional, both in construction and in manner of operation, and no detailed explanation is believed to be necessary.

Purely by way of illustration, and in no sense by way of limitation, the following circuit component values may be employed in the circuit of Figure 1:

| | |
|---|---|
| Device 21 | Type 12BA7 |
| Device 56 | Type 12AT7 |
| Device 73 | Type 12AU6 |
| Device 91 | Type 12AT6 |
| Device 114 | Type 35B5 |
| Condenser 31 | 0.01 microfarad |
| Resistor 30 | 10,000 ohms |
| Resistor 44 | 3,300 ohms |
| Condenser 41 | 4 micro-microfarads |
| Condenser 38 | 18 micro-microfarads |
| Inductor 46 | 0.25 henry |
| Inductors 50 and 51 | 40 millihenries each |
| Condenser 52 | 36 micro-microfarads |
| Condenser 53 | 12 micro-microfarads |
| Resistor 58 | 1,000 ohms |
| Resistor 66 | 1,000 ohms |
| Resistor 68 | 8,200 ohms |
| Resistor 69 | 330 ohms |
| Condenser 70 | 400 micro-microfarads |
| Resistor 61 | 47,000 ohms |
| Resistor 72 | 47,000 ohms |
| Resistor 86 | 47,000 ohms |
| Condenser 87 | 50 micro-microfarads |
| Resistor 89 | 47,000 ohms |
| Condenser 96 | 25 micro-microfarads |
| Resistor 97 | 150,000 ohms |
| Resistor 99 | 150,000 ohms |
| Condenser 100 | 500 micro-microfarads |
| Resistor 106 | 100,000 ohms |
| Condenser 107 | 0.001 microfarad |
| Resistor 109 | 1.5 megohms |
| Resistor 110 | 470,000 ohms |
| Condenser 111 | 0.05 microfarad |
| Resistor 113 | 390,000 ohms |

Other components utilized in the circuit of Figure 1 are conventional in nature, and proper values will be apparent to those skilled in the art.

With a receiver constructed in accordance with these specifications, the intermediate-frequency channel is selective to an intermediate-frequency band having a width of 150 kilocycles per second and extending from 25 to 175 kilocycles per second, being centered about a frequency of 100 kilocycles per second, and an overall gain in amplifier-converter 10 of the order of 500 times is obtained. A receiver of this type is particularly useful for the reception of frequency modulation signals in the portion of the frequency spectrum from 88 to 108 megacycles per second, which constitutes the present frequency modulation broadcasting band and in which the minimum carrier frequency separation in any one locality is set at 400 kilocycles per second.

In summary, the present invention provides a simplified radio receiver incorporating a novel and simplified single stage employing a single electron discharge device and a single tuned circuit to obtain radio-frequency amplification and frequency conversion. By utilizing a particularly low intermediate-frequency, the efficiency of radio-frequency amplification and frequency conversion is made high enough to provide an overall gain greatly exceeding that obtainable with a conventional two-stage amplifier-converter, and at the same time, the adjustment of the receiver is substantially simplified by virtue of the fact that no tracking is required between a plurality of tuned circuits, as in conventional receivers.

While the invention is shown and described in connection with certain specific embodiments thereof, it is to be understood that numerous variations and modifications may be made. It is therefore contemplated in the appended claims to cover all such variations and modifications as fall within the true spirit and scope of the invention.

We claim:

1. A single-tube amplifier-converter comprising: an electron discharge device having in the order named a cathode, an input grid, a control system comprising an accelerating electrode followed by a control grid, and an anode disposed across a common electron path; an input circuit including said input grid and said cathode for receiving an input signal having desired modulation components within a predetermined signal frequency band; an oscillating system including said discharge device for producing a heterodyning frequency signal; only one parallel resonant circuit, said parallel resonant circuit being included in said oscillating system, tuned to said heterodyning frequency, and coupled to said control grid and said cathode; and an aperiodic output circuit, including a low-pass filter, coupled to said anode and to said cathode and selective to an intermediate frequency band having a width at least equal to that of said signal frequency band and comprising exclusively frequencies lower than one-half of the product of the mean effective transconductance within said signal frequency band of said input grid with respect to said control grid, the mean branch reactance of said parallel resonant circuit, and said heterodyning frequency, whereby an amplified replica of said input signal is developed at said control grid by virtue of space charge coupling from said input grid to said control grid and frequency conversion is effected by intermodulation of said heterodyning frequency signal and said amplified replica of said input signal.

2. A single-tube amplifier-converter comprising: an electron discharge device having in the order named a cathode, an input grid, a control system comprising an accelerating electrode followed by a control grid, and an anode disposed across a common electron path; an input circuit including said input grid and said cathode for receiving an input signal having desired modulation components within a predetermined signal frequency band which is centered with respect to a first frequency; an oscillating system including said discharge device for producing a heterodyning frequency signal; only one parallel resonant circuit, said parallel resonant circuit being included in said oscillating system, tuned to said heterodyning frequency, and coupled to said control grid and said cathode and presenting therebetween an impedance throughout said modulation component frequency band at least equal to the reciprocal of the effective transconductance of said input grid with respect to said control grid at said first frequency; and an aperiodic output circuit, including a low-pass filter, coupled to said anode and to said cathode and selective to an intermediate-frequency band having a width at least equal to that of said modulation component frequency band and centered with respect to a frequency corresponding to the difference between said first frequency and said heterodyning frequency, whereby an amplified replica of said input signal is developed at said control grid by virtue of space charge coupling from said input grid to said control grid and frequency conversion is effected by intermodulation of said heterodyning frequency signal and said amplified replica of said input signal.

3. A single-tube amplifier-converter comprising: an electron discharge device having in the order named a cathode, an input grid, a control system comprising an accelerating electrode followed by a control grid, and an anode disposed across a single electron path; an input circuit including said input grid and said cathode for receiving an input signal having desired modulation components within a predetermined frequency band which is centered with respect to a first frequency; an oscillating system including said discharge device for producing a heterodyning frequency signal; only one parallel resonant circuit, said parallel resonant circuit being included in said oscillating system, tuned to said heterodyning frequency, and coupled to said control grid and said cathode and presenting therebetween an impedance throughout said modulation component frequency band substantially greater than the reciprocal of the effective transconductance of said input grid with respect to said control grid at said first frequency; and an aperiodic output circuit including a low-pass filter, coupled to said anode and to said cathode and selective to an intermediate frequency band having a width at least equal to that of said modulation component frequency band and being centered with respect to a frequency corresponding to the difference between said first frequency and said heterodyning frequency, whereby an amplified replica of said input signal is developed at said control grid by virtue of space charge coupling from said input grid to said control grid and frequency conversion is effected by intermodulation of said heterodyning frequency signal and said amplified replica of said input signal.

4. A single-tube amplifier-converter comprising: an electron discharge device having in the order named a cathode, an input grid, a control system comprising an accelerating electrode followed by a control grid, and an anode disposed across a single electron path; an input circuit including said input grid and said cathode for receiving an input signal having desired modulation components within a predetermined frequency band which is centered with respect to a first frequency; an oscillating system including said discharge device for producing a heterodyning frequency signal; only one parallel resonant circuit, said parallel resonant circuit being included in said oscillating system, tuned to said heterodyning frequency, and connected between said control grid and said cathode and presenting therebetween an impedance throughout said modulation component frequency band substantially greater than the reciprocal of the effective transconductance of said input grid with respect to said control grid at said first frequency; and an aperiodic output circuit, including a low-pass filter, coupled to said anode and to said cathode and selective to an intermediate frequency band having a width at least equal to that of said modulation component frequency band and being centered with respect to a frequency corresponding to the difference between said first frequency and said heterodyning frequency, whereby an amplified replica of said input signal is developed at said control grid by virtue of space charge coupling from said input grid to said control grid and frequency conversion is effected by intermodulation of said heterodyning frequency signal and said amplified replica of said input signal.

5. A radio receiver comprising, in combination: a single-tube amplifier-converter comprising an electron discharge device having in the order named a cathode, an input grid, a control system comprising an accelerating electrode followed by a control grid, and an anode disposed across a single electron path, an input circuit including said input grid and said cathode for receiving an input signal having desired modulation components within a predetermined signal frequency band which is centered with respect to a first frequency, an oscillating system including said discharge device for producing a heterodyning frequency signal, only one parallel resonant circuit, said parallel resonant circuit being included in said oscillating system, tuned to said heterodyning frequency, and coupled to said control grid and said cathode and presenting therebetween an impedance throughout said modulation component frequency band at least equal to the reciprocal of the effective transconductance of said input grid with respect to said control grid at said first frequency, and an aperiodic output circuit, including a low-pass filter, coupled to said anode and to said cathode and selective to an intermediate frequency band having a width at least equal to that of said signal frequency band and centered with respect to a frequency corresponding to the difference between said first frequency and said heterodyning frequency; and an intermediate-frequency channel coupled to said output circuit and selective to said intermediate-frequency band, whereby an amplified replica of said input signal is developed at said control grid by virtue of space charge coupling from said input grid to said control grid and frequency conversion is effected by intermodulation of said heterodyning frequency signal and said amplified replica of said input signal.

6. A radio receiver comprising, in combination: a single-tube amplifier-converter comprising an electron discharge device having in the order named a cathode, an input grid, a control system comprising an accelerating electrode followed by a control grid, and an anode disposed across a single electron path, an input circuit including said input grid and said cathode for receiving an input signal having desired modulation components within a predetermined signal frequency band, an oscillating system including said discharge device for producing a heterodyning frequency signal, only one parallel resonant circuit, said parallel resonant circuit being included in said oscillating system, tuned to said heterodyning frequency, and coupled to said control grid and said cathode, and an aperiodic output circuit, including a low-pass filter, coupled to said anode and to said cathode and selective to an intermediate frequency band having a width at least equal to that of said signal frequency band and comprising exclusively frequencies lower than one-half of the product of the mean effective transconductance within said signal frequency band of said input grid with respect to said control grid, the mean branch reactance of said parallel resonant circuit, and said heterodyning frequency; and an intermediate frequency channel coupled to said output circuit and selective to said intermediate frequency band, whereby an amplified replica of said input signal is developed at said control grid by virtue of space charge coupling from said input grid to said control grid and frequency conversion is effected by intermodulation of said heterodyning frequency signal and said amplified replica of said input signal.

7. Apparatus for receiving signal information from any one of a plurality of modulated carrier waves having a minimum carrier frequency separation of a predetermined value and individually including desired modulation components within a frequency band having a width less than one-half of said predetermined value and being centered with respect to a first frequency, said apparatus comprising, in combination: a single-tube amplifier-converter comprising an electron discharge device having in the order named a cathode, an input grid, a control system comprising an accelerating electrode followed by a control grid, and an anode disposed across a single electron path, an input circuit including said input grid and said cathode for receiving any of said modulated carrier waves, an oscillating system including said discharge device for producing a heterodyning frequency signal differing from said first frequency by a third frequency equal to substantially one-quarter of said predetermined value; only one parallel resonant circuit, said parallel resonant circuit being included in said oscillating system, tuned to said heterodyning frequency, and coupled to said control grid and said cathode and presenting therebetween an impedance throughout said modulation component frequency band substantially greater than the reciprocal of the effective transconductance of said input grid with respect to said control grid at said first frequency, and an aperiodic output circuit, including a low-pass filter, coupled to said anode and to said cathode and selective to an intermediate frequency band having a width at least equal to that of said modulation component frequency band and centered with respect to said third frequency, whereby an amplified replica of said received modulated carrier wave is developed at said control grid by virtue of space charge coupling from said input grid to said control grid and frequency conversion is effected by intermodulation of said heterodyning frequency signal and said amplified replica of said received carrier wave; and an intermediate frequency channel coupled to said output circuit and selective to said intermediate frequency band.

8. Apparatus for receiving signal information from any one of a plurality of modulated carrier waves having a minimum carrier frequency separation of a predetermined value and individually including desired modulation components within a frequency band having a width less than one-half of said predetermined value and being centered with respect to a first frequency, said apparatus comprising, in combination: a single-tube amplifier-converter comprising an electron discharge device having in the order named a cathode, an input grid, a control system comprising an accelerating electrode followed by a control grid, and an anode disposed across a single electron path, an input circuit including said input grid and said cathode for receiving any of said modulated carrier waves, an oscillating system including said discharge device for producing a heterodyning frequency signal differing from said first frequency by a third frequency equal to substantially one-quarter of said predetermined value, only one parallel resonant circuit, said parallel resonant circuit being included in said oscillating system, tuned to said heterodyning frequency, and coupled to said control grid and said cathode, and an aperiodic output circuit, including a low-pass filter, coupled to said anode and to said cathode and selective to an intermediate frequency band having a width at least equal to that of said signal frequency band centered with respect to said third frequency, and comprising exclusively frequencies lower than one-half of the product of the mean effective transconductance within said signal frequency band of said input grid with respect to said control grid, the mean branch reactance of said parallel resonant circuit, and said heterodyning frequency, whereby an amplified replica of said received modulated carrier wave is developed at said control grid by virtue of space charge coupling from said input grid to said control grid and frequency conversion is effected by intermodulation of said heterodyning frequency signal and said amplified replica of said received carrier wave; and an intermediate-frequency channel coupled to said output circuit and selective to said intermediate-frequency band.

ROBERT ADLER.
JOHN G. SPRACKLEN.

REFERENCES CITED

The following references are of record in the file of this patent:

UNITED STATES PATENTS

| Number | Name | Date |
|---|---|---|
| 2,050,474 | Stone | Aug. 11, 1936 |
| 2,051,178 | Roberts | Aug. 18, 1936 |
| 2,067,536 | Klotz | Jan. 12, 1937 |
| 2,252,584 | Strutt | Aug. 12, 1941 |
| 2,268,830 | Kleen | Jan. 6, 1942 |
| 2,323,250 | Smith | June 29, 1943 |